United States Patent [19]
Hart et al.

[11] Patent Number: 5,503,011
[45] Date of Patent: Apr. 2, 1996

[54] TEST CONNECTOR FOR AUTOMATIC TEST DEVICE

[75] Inventors: James E. Hart, Trafford; Daniel G. Scott, Pittsburgh; Gary M. Sich, Irwin; Gregory L. Johnston, Tarentum, all of Pa.

[73] Assignee: Westinghouse Air Brake Company, Wilmerding, Pa.

[21] Appl. No.: 366,160

[22] Filed: Dec. 29, 1994

[51] Int. Cl.$^6$ .................................................. B60T 17/22
[52] U.S. Cl. .............................. 73/127; 73/39; 73/863.86
[58] Field of Search ............................... 73/121, 128, 129, 73/39, 866.5, 863.86

[56] References Cited

U.S. PATENT DOCUMENTS

| | | | |
|---|---|---|---|
| 1,997,749 | 4/1935 | Safford | 73/39 |
| 2,509,816 | 5/1950 | Elson | 73/39 |
| 3,596,500 | 8/1971 | Rees | 73/39 |
| 3,727,453 | 4/1973 | Rees | 73/39 |
| 3,872,711 | 3/1975 | Atkinson et al. | 73/39 |
| 3,945,684 | 3/1976 | Chellis | 73/39 |
| 3,958,454 | 5/1976 | Rasch | 73/121 |
| 4,361,362 | 11/1982 | Fauck | 73/39 |
| 4,440,015 | 4/1984 | Hann | 73/121 |
| 4,854,614 | 8/1989 | Torichigai et al. | 73/866.5 |
| 5,359,905 | 11/1994 | Brodbeck | 73/863.86 |

FOREIGN PATENT DOCUMENTS

| | | | |
|---|---|---|---|
| 1228437 | 11/1966 | Germany | 73/128 |
| 0308897 | 9/1971 | U.S.S.R. | 73/129 |
| 0522978 | 8/1976 | U.S.S.R. | 73/129 |
| 1084162 | 4/1984 | U.S.S.R. | 73/121 |
| 1512840A | 10/1989 | U.S.S.R. | 73/121 |
| 1562191 | 5/1990 | U.S.S.R. | 73/121 |

*Primary Examiner*—Richard Chilcot
*Assistant Examiner*—George M. Dombroske
*Attorney, Agent, or Firm*—Gary J. Falce

[57] ABSTRACT

A test connector for connecting an air brake test device to access ports provided on an air brake control valve device where such access ports are normally closed by check valves is disclosed. In one embodiment, a plurality of stem operators project into the access ports without opening the check valves therein when the test connector is installed in position on the control valve device. A handle is provided to effect rotation of an eccentric shaft on which the stem operators are connected to unseat the check valves and thereby access air at the respective access ports when it is desired to initiate testing following installation of the test connector. In an alternate embodiment, a plurality of test probes pivotally mounted on the test connector body enter the access ports and unseat the check valves in the course of installing the test connector in position on the control valve. In both embodiments, the stem operators/test probes are self-aligning to facilitate installation of the test connector.

16 Claims, 6 Drawing Sheets

FIG. 8
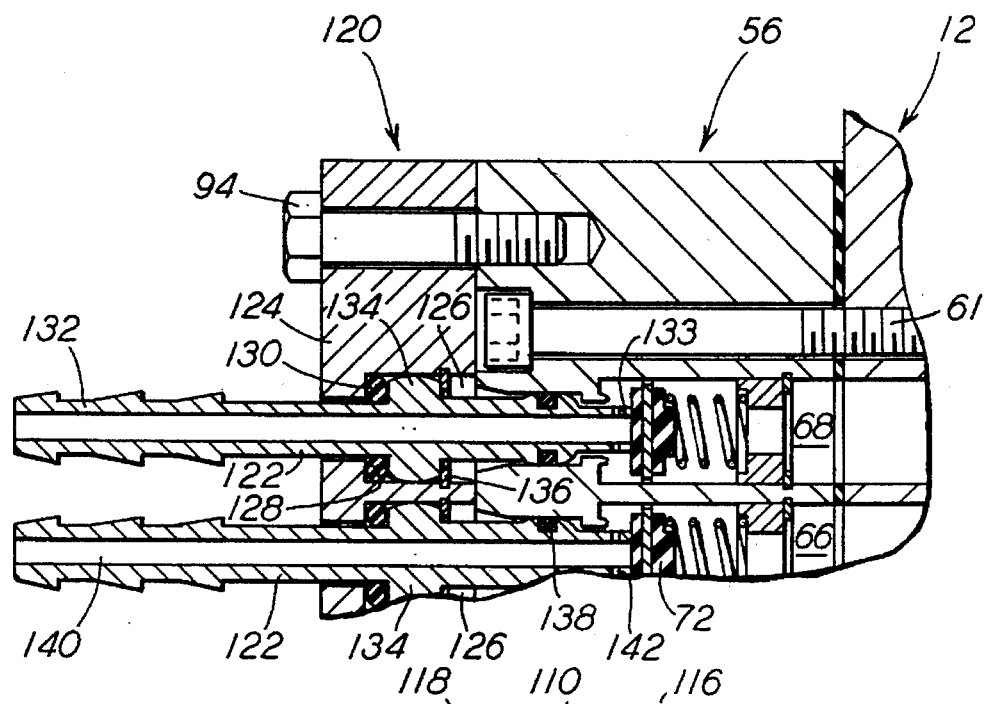
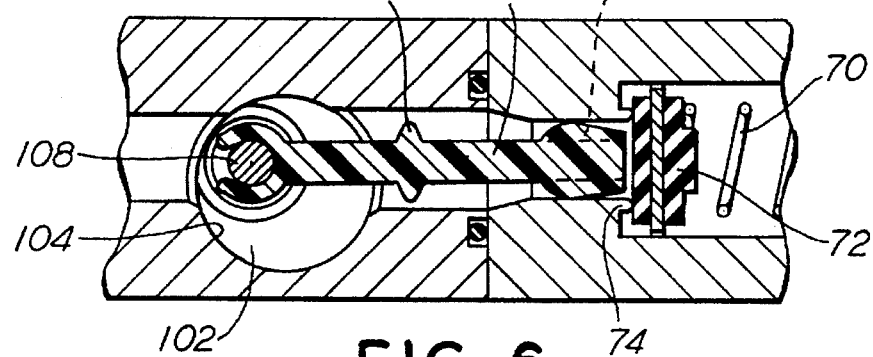
FIG. 6
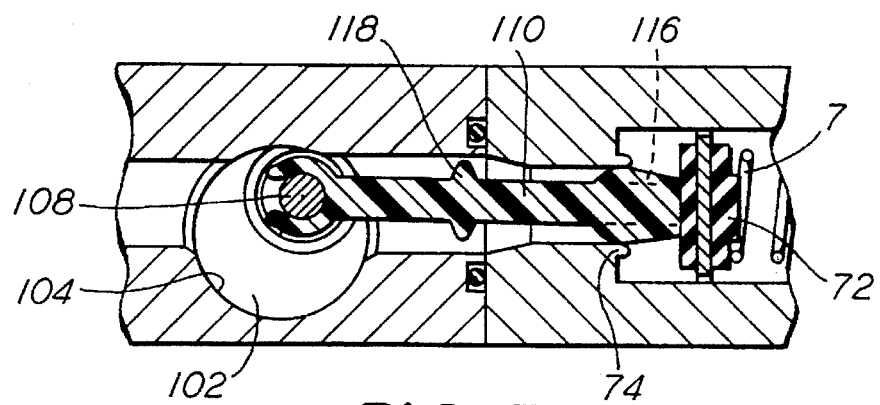
FIG. 7

TEST CONNECTOR FOR AUTOMATIC TEST DEVICE

BACKGROUND OF THE INVENTION

This invention relates to the automatic testing of railroad car brake equipment and particularly to means for directly accessing specific fluid pressure channels of brake control valve devices for use in conducting automatic testing of the car air brakes.

Historically, single car testing on "in-service" freight cars has been performed to provide a general check on the condition of the car brake equipment. A well-known single car test device is employed to enable this testing to be accomplished without removal of any of the brake components from the car. In general, the testing procedure is accomplished manually and entails a prescribed sequence of operation of different cocks, appropriate setting of a pressure regulator and monitoring of different pressure gages and timing devices comprising the single car test device.

Presently, an automatic single car test device is under development, which requires access to various pressure channels of the car control valve device.

Where standard pipe brackets having service and emergency valve portions mounted on opposing faces thereof are employed, such access is provided by a special adapter plate that is interposed between the pipe bracket and one of the opposed valve portions. The adapter plate is provided with access ports via which test ports associated with various fluid pressure channels may accessed.

In the case of the more recently developed single-sided pipe bracket on which the service and emergency valve portions are mounted on the same side thereof, test ports are provided on this single valve mounting face generally intermediate the respective valve portions. An access housing having access ports communicated with the test ports facilities access to the test ports.

In both the standard pipe bracket as well as the newly developed pipe bracket, spring loaded check valves are provided to maintain the access ports closed under normal operating conditions.

SUMMARY OF THE INVENTION

The object of the present invention is to provide a multi-probe test connector for establishing fluid pressure communication between the pipe bracket test ports of a control valve device and an automatic tester for conducting the single car test.

A more specific object of the invention is to provide a multi-probe test connector having self-aligning probes, each adapted to assure engagement of a respective one of the pipe bracket test ports without requiring such close manufacturing tolerances as to be cost prohibitive.

A still further object of the invention is to provide a test connector having an open and a closed position to permit installation of the test connector without concurrently opening the check valves incorporated in the access ports, thereby preventing any inadvertent escape of pressurized air during such installation.

In accordance with the present invention, these objectives are accomplished by providing in one embodiment of the invention a test connector in which a plurality of actuator stems are mounted on an eccentric shaft that can be rotated by a handle between open and closed positions. In the closed handle position, the actuator stems are retracted, so that when installing the test connector in position, the check valves remain closed to prevent any escape of compressed air from the access ports. Movement of the handle to open position when it is desired to initiate the automatic test extends the actuator stems to engage and unseat the access port check valves so that air can flow therefrom to the test device.

In an alternate embodiment of the invention, a plurality of test probes are pivotally mounted in the test connector body in axially fixed relationship with the access port check valves, so that in the course of installing the test connector, the test probes engage and unseat the access port check valves. In this manner, air is automatically accessed for conducting the automatic test.

In both embodiments, the actuator stems/test probes are self-aligning with the access ports to facilitate installation of the test connector.

BRIEF DESCRIPTION OF THE DRAWINGS

These and other objects and attendant advantages of this invention will become apparent from the following more detailed explanation when taken in conjunction with the accompanying drawings in which:

FIG. 6 is an enlarged section view of one of the actuator stems of the test connector of FIG. 4 taken along the line 6—6;

FIG. 7 is a view similar to FIG. 6 showing the actuator stem in a different position; and FIG. 8 is a section view of an alternate embodiment of a test connector.

DESCRIPTION AND OPERATION

The present invention will be explained in conjunction with an AB type freight brake control valve device 10 that employs a new style, single-faced pipe bracket 12, it being understood that the present invention is also applicable to control valve devices employing the industry standard old style pipe bracket having opposing mounting faces to which the service and emergency valve portions are affixed.

Figure 1:
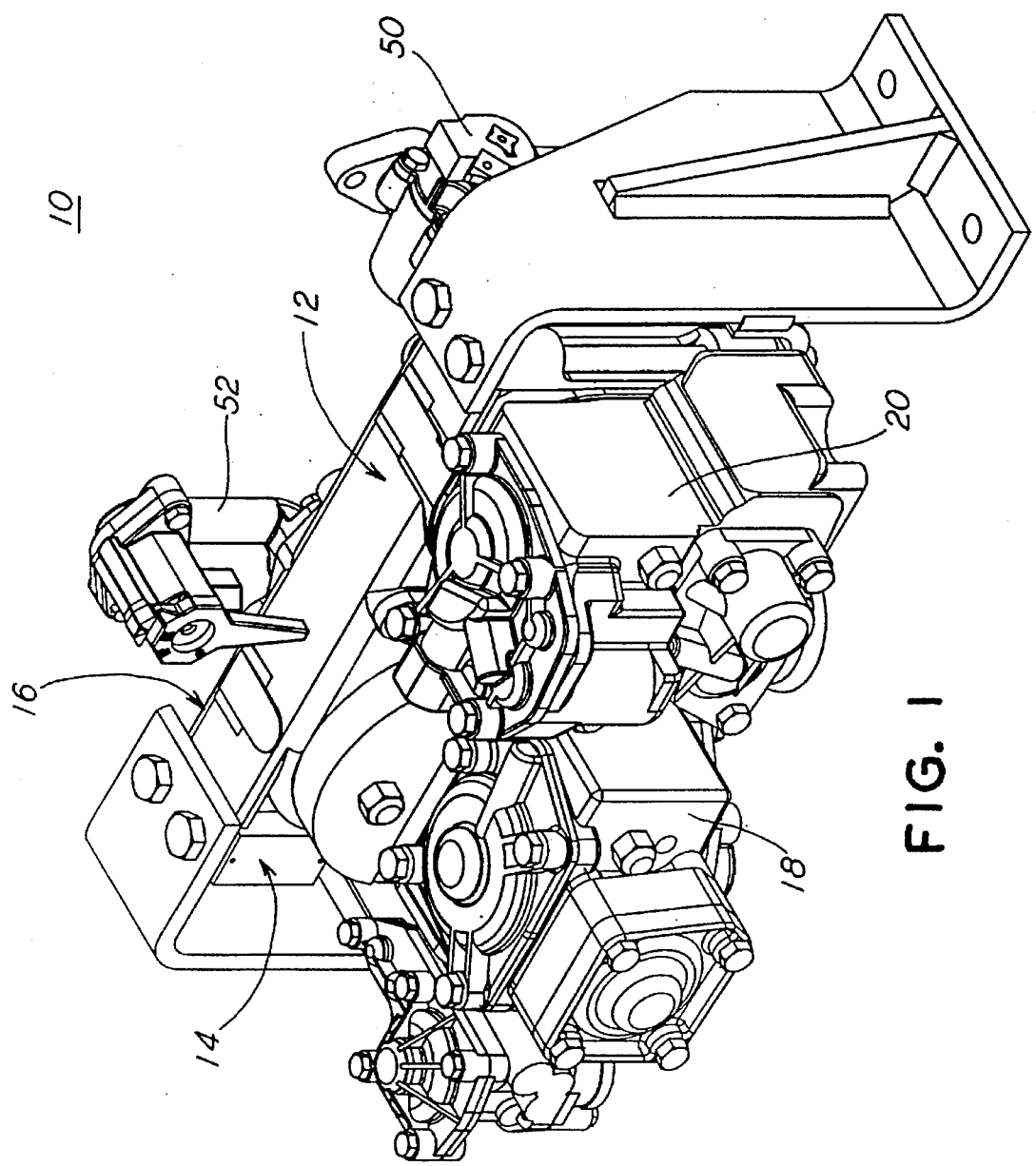
FIG. 1 is an isometric view of a brake control valve device for railroad freight cars including a newly developed pipe bracket portion having a single valve mounting face to which the typical service and emergency valve portions are connected.

As shown in FIG. 1, the preferred, single-faced pipe bracket portion 12 includes a front side 14 and a back side 16, the front side 14 having mounted thereto an emergency portion 18 and service portion 20. Both the emergency and service portions, 18, 20, as shown, are mounted by any suitable means such as by using threaded bolts or studs. The emergency portion 68 and service portion 20 are mounted upon opposite ends of front face 14. The emergency portion 18 and service portion 20 are spaced apart a selected amount such that an area or space is provided between the emergency portion 18 and the service portion 20 on the front face 14 of pipe bracket portion 12.

A brake pipe connection (not shown) connects a brake pipe to the pipe bracket portion 12 and is provided at the back side 16 of the pipe bracket portion 12. A brake cylinder, a brake cylinder retaining valve, an emergency reservoir and an auxiliary reservoir(each not shown) are also connected to the back side 16 of the pipe bracket portion 12, by any suitable means, such as by pipes and flanged fittings. A retainer 52 and a dirt collector 50 are also connected to the pipe bracket portion back side 16.

Figure 2:
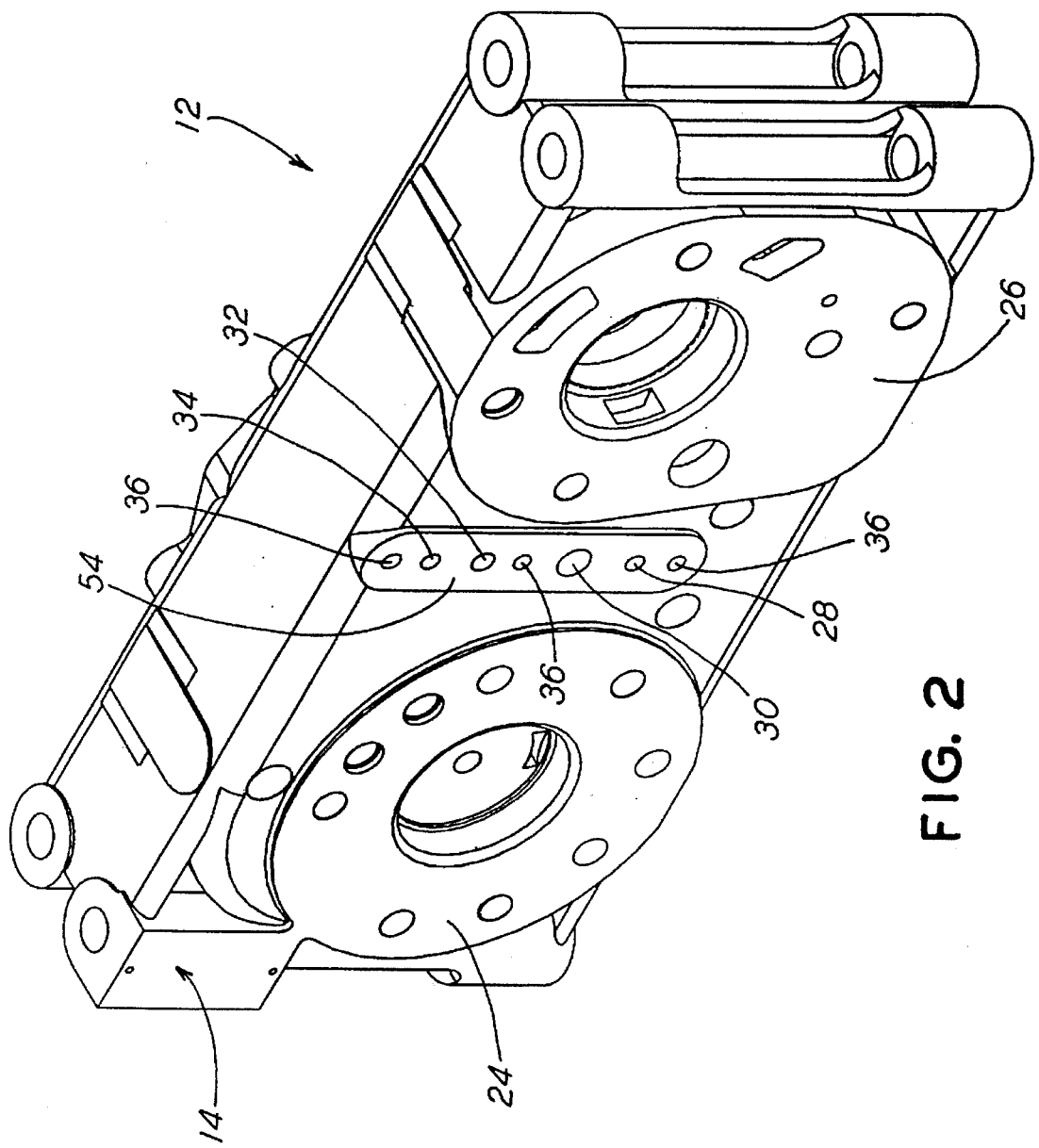
FIG. 2 is an isometric view of the pipe bracket portion of FIG. 1 with the service and emergency valves removed and showing a plurality of test ports via which pressurized air may be accessed for conducting an automatic test procedure.

Referring next to FIG. 2, the preferred pipe bracket portion 12 is shown having the emergency portion 18 and the service portion 20 detached therefrom. The emergency portion 18 is mountable to a mounting surface 24 on the pipe bracket portion front side 14 and the service portion 20 is also mountable to a mounting surface 26 on the pipe bracket portion front side 14. Between the mounting surface 24 and the mounting surface 26 lies an area on pipe bracket portion front side 14 in which are located four test ports 28, 30, 32, 34. Test port 28 connects to the brake cylinder passageway, test port 30 to the brake pipe passageway, test port 32 to the auxiliary reservoir passageway and test port 34 to the emergency reservoir passageway (the passageways are not shown in FIG. 2). The test ports 28, 30, 32, 34 are located upon a mounting surface or boss 54 of the pipe bracket portion 12. The boss 54 is preferably integral with the pipe bracket portion 12 and its surface is preferably planar. Threaded screw holes 36 are also preferably provided on boss 54. Fluid pressure in each air line may be monitored by accessing the air through the test ports 28, 30, 32, 34.

Figure 3:
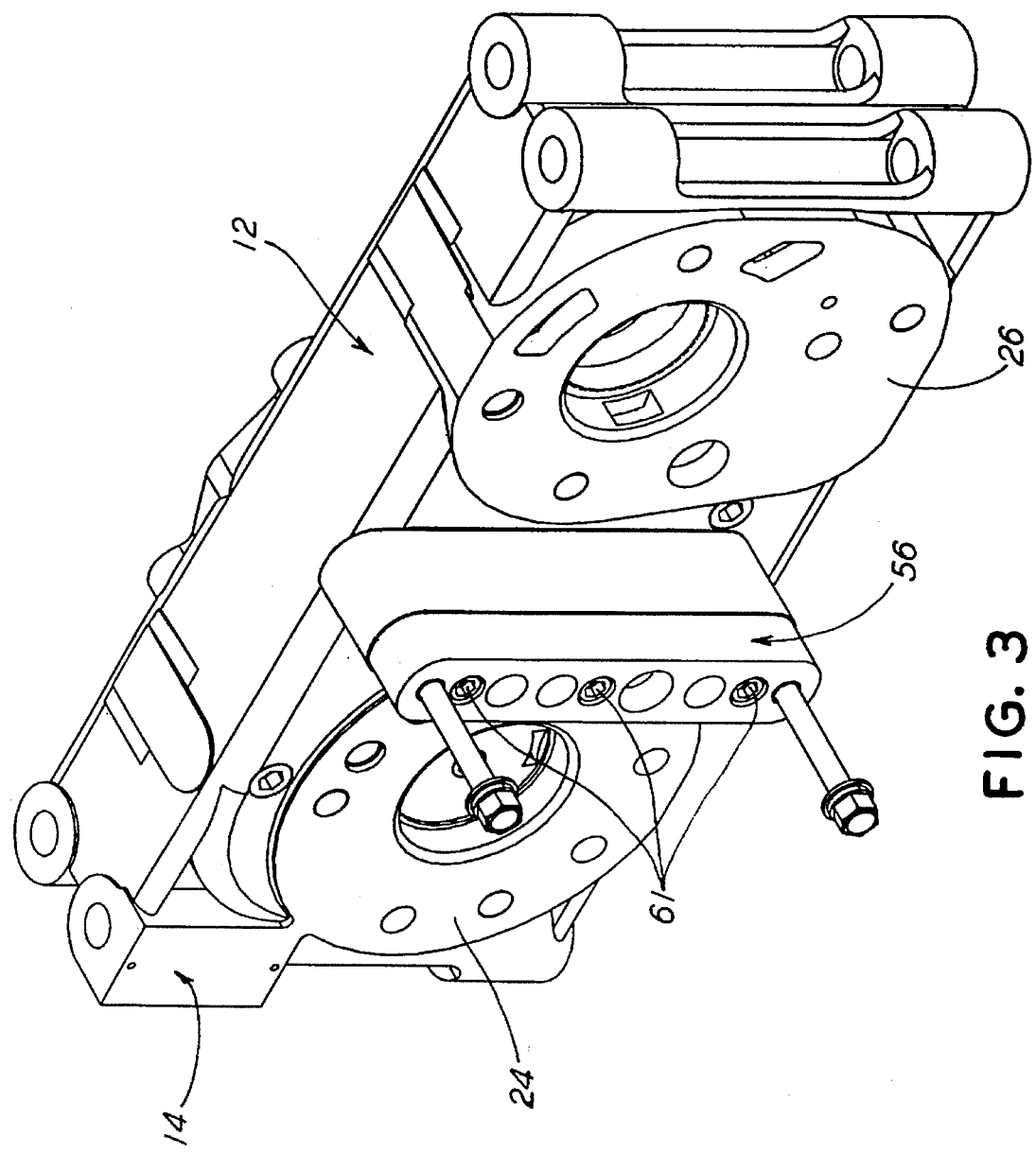
FIG. 3 is an isometric view of the pipe bracket portion of FIG. 2 having an access housing affixed to the test port area of the pipe bracket to provide access to the test ports and to maintain closure of the test ports during normal valve operation.

Referring next to FIG. 3, an access housing 56 is shown attached to the pipe bracket portion 12. As can be seen, the access housing 56 is mounted upon the pipe bracket portion front side 14 at boss 54. The access housing 56 may be affixed to the pipe bracket portion front side 14 by any convenient means such as by housing screws 61. Preferably, the access housing 56 has a planar surface which mates with the planar surface of boss 54. It is further preferred that a gasket be provided between the access housing 56 and the pipe bracket portion first side 14.

Figure 5:
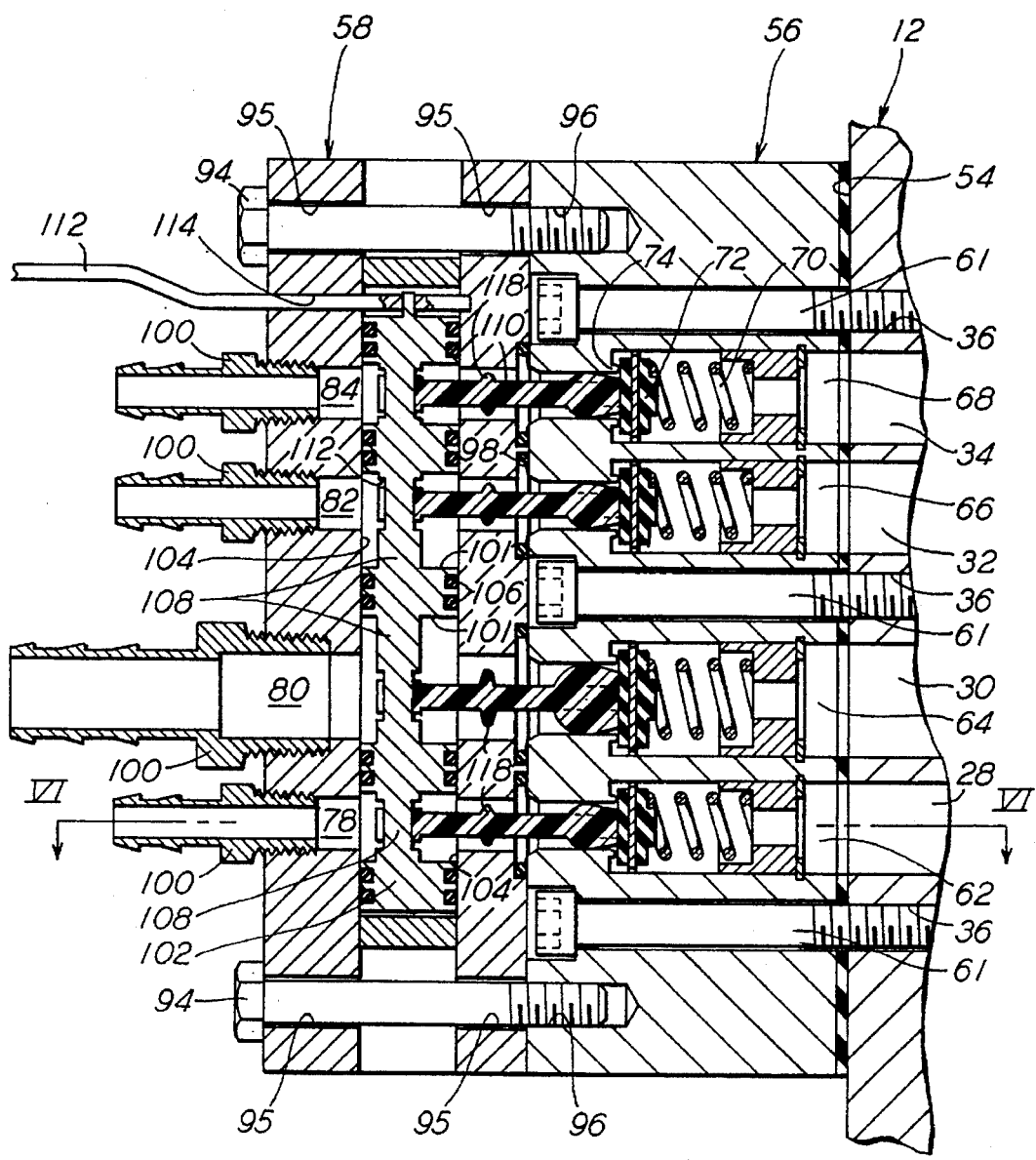
FIG. 5 is a cross-sectional view of the access housing and test connector of FIG. 4 taken along the line 5—5.

As shown in FIG. 5, access housing 56 has channels 62, 64, 66, 68 for communicating with the respective test ports 28, 30, 32, 34. The housing channels 62, 64, 66, 68 have opposed ends, with one end of each channel 62, 64, 66, 68 being sized and configured to connect to and sealably engage with the respective test ports 28, 30, 32, 34. Furthermore, the housing channels 62, 64, 66, 68 are positioned in the access housing 56 such that when the access housing 56 is placed in contact with boss 54, the housing channels 62, 64, 66, 68 are aligned with the respective test ports, 28, 30, 32, 34 of the pipe bracket portion front side 14.

Within each housing channel 62, 64, 66, 68, is a valve seat 74. Access housing 56 has check valves provided therein. Preferably, a number of check valves are provided within the access housing 56, such that a respective check valve is provided within each of the housing channels 62, 64, 66, 68. Each such check valve is preferably comprised of a spring 70 seated within the housing channel, and a valve element 72 engageable with the spring 70, which together operate in connection with the valve seat 74. The valve elements 72 of these check valves are each movable within their respective housing channels 62, 64, 66, 68 and are normally biased by the springs 70 into contact with the valve seats 74. With check valve elements 72 in biased contact with the respective valve seats 74, the check valves are said to be in a closed position, in which fluid at the test ports 28, 30, 32, 34 is prevented from escaping through the access housing 56.

Figure 4:
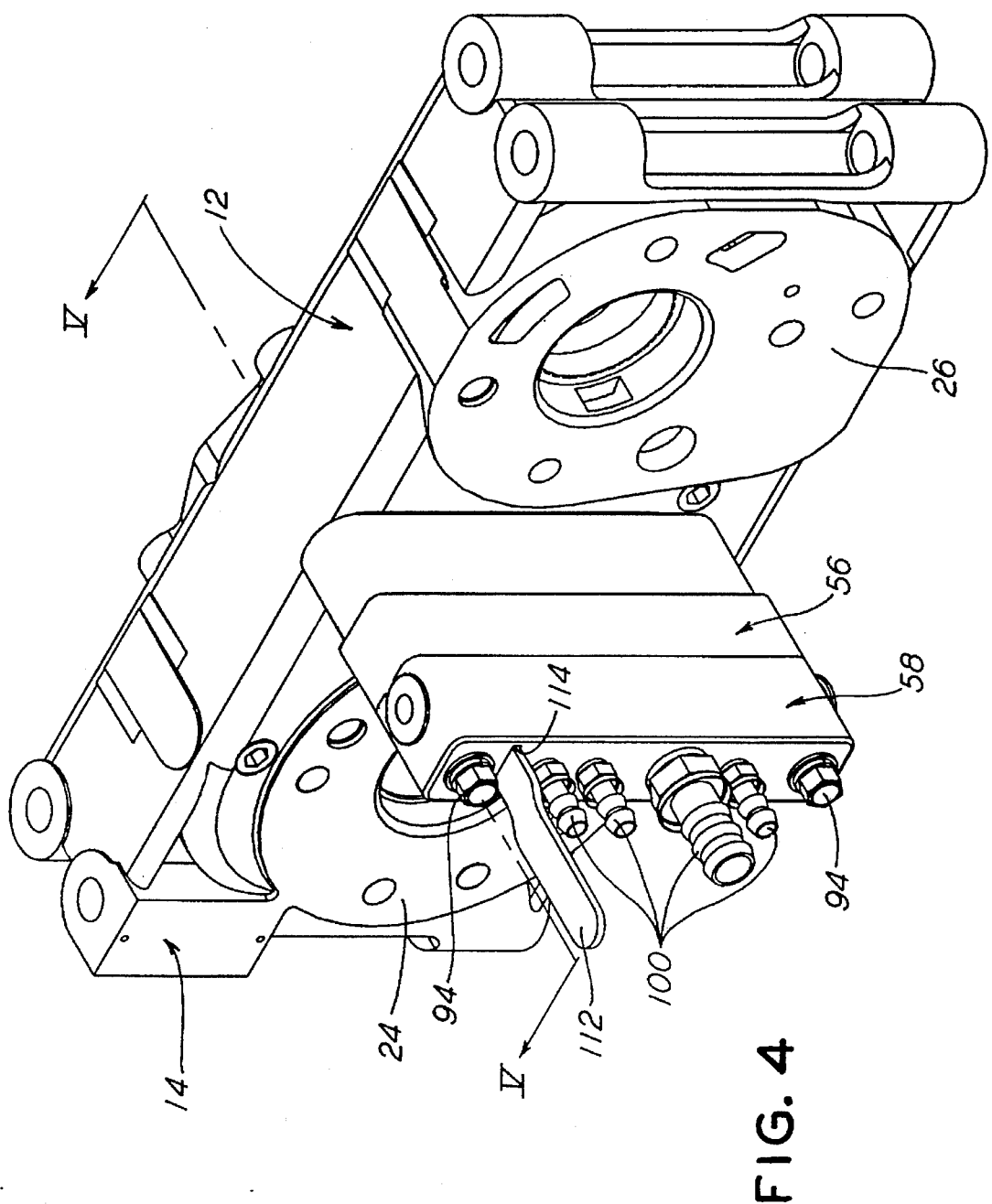
FIG. 4 is an isometric view of the pipe bracket portion of FIG. 3 having a preferred embodiment of a test connector affixed to the housing access.

As can also be seen in FIGS. 4 and 5, a preferred embodiment of test connector 58 is attached to access housing 56 when it is desired to access the fluid pressures of the various test ports 28, 30, 32, 34. The preferred test connector 58 and the access housing 56 may be connected by any convenient means such as by screws 94 that pass through holes 95 in test connector 58 and engage threaded holes 96 in access housing 56.

Test connector 58 has through channels 78, 80, 82, 84 that are aligned with the respective access housing channels 62, 64, 66, 68 when the test connector is bolted in place on access housing 56. Seal rings 98 surround the test connector through channels at the interface between the test connector and access housing to provide a fluid pressure seal thereat. At the opposite face of the test connector, the through channels have hose fittings 100 threaded thereto, such fittings having a barbed end to which a hose (not shown) may be connected from a test device (not shown).

A rotary actuator 102 is disposed in a bore 104 that is transverse to through channels 78, 80, 82, 84. Seal rings 106 are provided on the periphery of rotary actuator 102 at each side of the through channels 78, 80, 82, 84 to seal bore 104 against fluid pressure leakage. Actuator 102 is formed with an annular recess 101 intermediate seal rings 106 via which fluid pressure effective in the respective through channels 78, 80, 82, 84 is able to flow past actuator 102. Each recess is such that an eccentric 108 is formed on actuator 102 at the intersection of each through channel 78, 80, 82, 84 with bore 104.

An actuator stem 110 formed preferably of plastic is attached at one end on each eccentric 108 so as to have limited axial movement thereon. This limited axial movement is defined by axially spaced stop shoulders 112 formed at each recess 101, for a purpose hereinafter explained. The attached end of the stems 110 are generally U-shaped so as to fit over eccentric 108 with sufficient clearance as to permit relative rotation therebetween. As shown in FIGS. 6 and 7, this U-shaped end of stem 110 is non-continuous, in that the end is open, such opening being slightly smaller than eccentric 108 to allow the end to be snap-fit over the eccentric by reason of the elastic nature of plastic.

Stems 110 are disposed in through channels 78, 80, 82, 84 and in corresponding housing channels 62, 64, 66, 68 such that each end of stem 110 opposite the connected end is located adjacent a respective check valve element 72.

A handle 112 operates in a slot 114 in the test connector body and is assembled onto one end of actuator 102 in any suitable manner to effect rotation of the actuator in response to handle movement between open and closed positions. Movement of handle 112 is limited to approximately 90° rotation by engagement with the ends of slot 114 to define such open and closed positions of the handle.

In the normally closed position of handle 112, as shown in FIG. 6, the opposite end of stem 110 is spaced from check valve element 72 to permit spring 70 to seat valve element 72 and thereby maintain closure of the test ports, it being understood that all of the respective check valves are closed concurrently. This is the proper position of handle 110 when the test connector 58 is being bolted in place on access housing 56, which ensures that pressurized air is not lost during assembly of the test connector with the access housing. It will be noted that this opposite end of actuator stem 110 is generally bulbous-shaped, having a plurality of tapered flutes 116. The tapered flutes 116 facilitate entry of the respective actuator stems into access housing channels 62, 64, 66, 68, as the test connector 58 is assembled in position. The ends of access housing channels 62, 64, 66, 68 at the interface with the corresponding test connector channels are chamfered to cooperate with the tapered flutes 116 in order to provide for self-alignment of the actuator stems without requiring close manufacturing tolerances between the access housing and test connector parts.

Following assembly of test connector 58 on access housing 56, and prior to initiating the automated test procedure, handle 112 is shifted from its normal closed position at one end of slot 114 to its open position at the other extreme end of slot 114. As shown in FIG. 7, actuator 102 is rotated approximately 90°, whereby the actuator eccentric 108 is repositioned such as to extend actuator stem 110 sufficiently to engage and unseat check valve element 72 against the force of spring 70 at each of the respective access channels 62, 64, 66, 68. In the unseated check valve position, pressurized air is free to flow from the respective access channels to the automated tester via valve seat 74, flutes 116 of actuator stem 110, and the test connector through channels, without any escape of air either during the assembly of the test connector onto the access housing or thereafter.

It will be appreciated from FIGS. 6 and 7 that the axis of bore 104 is offset from the centerline of the respective through channels 78, 80, 82, 84 and aligned access channels 62, 64, 66, 68 in order to minimize the amount of lateral displacement or throw of eccentric 108 between the open and closed positions of handle 112 and thereby limit the amount of rocking motion of actuator stem 110. It will be further appreciated that the existing rocking motion at the opposite or bulbous-shaped end of actuator stem 110 is accommodated by the spherical shape of the bulbous end thereof. This, in turn, allows the size of the bulbous end of actuator stem 110 to be substantially the same as the diameter of the respective access channel in order to assure equal distribution of the lifting force on the access channel check valves. Still further, a preferably circular locator vane 118 is formed coaxially on actuator stem 110 intermediate its ends. In the closed handle position, and prior to assembly of test connector 58 onto access housing 56, this locator vane engages the respective through channel 78, 80, 82, 84 such as to support actuator stem 110 nearly perpendicular to the test connector mounting face and thereby provide for pre-alignment of the bulbous end of the actuator stem 110.

As previously mentioned, the connected end of a respective actuator stem 110 is free to shift axially on its eccentric 108 within the limits set by shoulders 112. This accommodates alignment of the actuator stem in an axial direction, as required by the guided, self-aligning action of the bulbous end of actuator stem 110 during assembly of the test connector 58 onto access housing 56.

Following completion of the test procedure and prior to removal of test connector 58 from access housing 56, handle 112 is shifted to its closed position in which actuator 102 is rotated approximately 90° in the opposite direction. Accordingly, eccentric 108 is rotated to its normal position, as shown in FIG. 6, to retract actuator stems 110 and thereby allow closure of the respective check valves. In this manner, no escape of pressurized air occurs during such removal of the test connector 58 from access housing 56.

An alternate embodiment of a test connector 120 is shown in FIG. 8. In this embodiment, several test probes 122 (only two being shown) are mounted on a probe plate 124 that is adapted to be bolted to access housing 56 in a manner similar to that of the preferred embodiment. Probe plate 124 is formed with a series of through openings 126 (only two being shown) that correspond in number and are aligned generally with through channels 62, 64, 66, 68 in access housing 56. Openings 126 are formed with a shoulder 128 on which a resilient member, such as an O-ring 130, rests.

Test probes 122 include at one end a barbed hose fitting 132 to which a test hose of an automatic tester, for example, is connected. The opposite end 133 of test probes 122 are adapted to project into the respective access housing channel 62, 64, 66, 68 for engagement with check valve element 72. Intermediate the ends of test probes 122 is formed an annular swivel flange 134 having a spherically-shaped surface that is received in through opening 126 with a relatively snug fit. A snap ring 136 bears against one side of swivel flange 134, while the other side bears against O-ring 130. In this manner, O-ring 130, by reason of its resiliency, acts in the manner of a centering spring to maintain test probes 122 generally perpendicular to the mounting face of probe plate 124. Another O-ring 138 is carried on the periphery of test probe 122 between its opposite end 133 and swivel flange 134. This O-ring 134 is adapted to engage and provide a pressure seal with access channel 68, as will hereinafter be explained. A central passage 140 that extends through test probes 122 and radial passages 142 communicates with central passage 140 at a location between O-ring 138 and opposite end 133 of test probes 122.

When it is desired to conduct an automatic test, the test connector 120 is assembled onto access housing 56 and bolted in place, as by bolts 94. During such assembly, the projecting opposite end 133 of test probes 122 enter the respective access housing channels 62, 64, 66, 68, such access channels being preferably chamfered at the opening thereof to gather the test probes. In the event misalignment exists between any of the test probes and their respective access channels, the opposite end 133 of a misaligned test probe will engage the access channel chamfer, causing the test probe to rotate about its swivel flange 134 to a slightly cocked position. This will compensate for slight misalignment between the test probe and access channel due to manufacturing tolerances, for example, and thereby allow continued movement of the test connector into mounting position on access housing 56. The elasticity of O-ring 130 allows for such cocking of test probe 122 by becoming compressed between shoulder 128 and swivel flange 134.

When test connector 120 is mounted in place on access housing 56, the other end of test probes 120 will engage and unseat the respective access channel check valves against springs 70. In this manner, the pressurized air effective in the access housing channels is conducted to the automatic tester (not shown) via valve seat 74, radial passages 142 and central passage 140 of test probe 122. In order to accommodate such cocking of any one of the test probes 120 without binding, the periphery of each test probe on both sides of O-ring 138 is arcuatly-shaped.

Upon disassembly of test connector 120 from access housing 56, test probes 122 are withdrawn and the access channel check valves are seated by springs 70 to prevent escape of pressurized air from the access housing channels.

What is claimed is:

1. A test connector for connecting a test device to a plurality of access ports associated with pipe bracket means to which are mounted a service valve portion and an emergency valve portion comprising a control valve device of a railroad car that is to be tested for proper brake operation, a respective one of said plurality of access ports being communicated with a brake pipe, an auxiliary reservoir, an emergency reservoir and a brake cylinder device, and being normally closed by check valve means, said test connector comprising:

(a) a body having a plurality of openings therethrough;

(b) means for connecting said body to said pipe bracket means such that said plurality of openings are aligned generally with said plurality of access ports; and (c) said check valve means including an annular valve seat in each of said plurality of access ports and an annular valve element cooperatively arranged relative thereto; and (d) actuator means for opening said check valve means comprising a plurality of stems each having one end adapted to enter a corresponding one of said access ports within the area of said valve seat, each said stem at a location proximate said one end being sized to provide a close fit with said corresponding access port within the area of said valve seat, and each said stem at a location displaced from said location proximate said one end having a pivotal connection to provide means for self-aligning said one end of said stem relative to a respective one of said access ports when a corresponding one of said openings is misaligned therewith.

2. A test connector as recited in claim 1, wherein said actuator means comprises manually operable means for opening said check valves after said connector is connected to said pipe bracket means.

3. A test connector as recited in claim 1, wherein said actuator means further includes:

(a) a bore in said body intersecting said plurality of openings;

(b) a cylindrical member rotatably disposed in said bore and having a plurality of annular recesses via which opposite ends of said plurality of openings are communicated, the axis of each of said plurality of recesses being offset from the axis of said cylindrical member to form a plurality of eccentric shafts that are aligned generally with said plurality of openings;

(c) each said stem at said displaced location having a generally U-shaped end having two appendages with which a corresponding one of said eccentric shafts is engageable to provide said pivotal connection thereof; and (d) means for selectively rotating said cylindrical member.

4. A test connector as recited in claim 3, wherein each said stem is plastic, the opening between the two appendages of said U-shaped end of each said stem being less than the diameter of said corresponding eccentric shaft whereby the appendages of said U-shaped end of each said stem snap over said corresponding eccentric shaft to hold said stem thereon.

5. A test connector as recited in claim 4, wherein said U-shaped end of each said stem is movable in an axial direction on said corresponding eccentric shaft and pivotal about the axis of said shaft.

6. A test connector as recited in claim 4, wherein the axis of said cylindrical member is offset from the axes of said plurality of openings.

7. A test connector as recited in claim 3, wherein said means for selectively rotating said cylindrical member comprises:

(a) a slot in said body opening into said bore, said slot terminating in a first stop and a second stop;

(b) a handle disposed in said slot and affixed to said cylindrical member to effect said rotation thereof with movement of said handle between said first and second stops to provide an open and a closed handle position.

8. A test connector as recited in claim 7, wherein;

(a) each said check valve means further includes;
(i) a disc valve element; and
(ii) a spring urging said disc valve element toward engagement with said valve seat; and (b) each said stem at said one end thereof being disengaged from said valve element in said closed position of said handle and engaged with said valve element to unseat said valve element from said valve seat in said open position of said handle.

9. A test connector as recited in claim 8, wherein said one end of each said stem is fluted.

10. A test connector as recited in claim 3, wherein said cylindrical member includes seal means on the periphery thereof at each side of said plurality of annular recesses therein.

11. A test connector as recited in claim 3, wherein each said stem further includes a projection intermediate said one end and said pivotal end, said projection being adapted to engage a corresponding one of said openings when said body is disconnected from said pipe bracket means to limit the degree of initial misalignment between said stem and said access port.

12. A test connector as recited in claim 1, further comprising a hose fitting in one of said opposites of said plurality of openings.

13. A test connector as recited in claim 1, wherein each of said plurality of openings is a fluid pressure channel.

14. A test connector as recited in claim 1, further comprising:

(a) said plurality of openings each having a shoulder formed between a bore and a counterbore;

(b) each said stem having a spherically-shaped projection at said displaced location in close fitting relationship with said counterbore to provide said pivotal connection, thereof;

(c) elastic means between said shoulder and said projection; and (d) a retainer ring in each said counterbore engaged with said projection on a side thereof opposite said elastic means, said retainer ring being located so as to effect engagement of said projection with said elastic means.

15. A test connector as recited in claim 14, wherein each said stem further comprises;

(a) a central passage therethrough, said stem proximate said one end having radial passages communicated with said control passage; and (b) hose fitting means formed at the end of said stem opposite said one end.

16. A test connector as recited in claim 15, wherein each said stem further comprises a seal ring engageable with a corresponding one of said plurality of access ports, said one end of each said stem engaging and unseating a corresponding one of said check valve means when said body is connected to said pipe bracket means.

* * * * *